United States Patent
Kynast et al.

(10) Patent No.: US 6,230,134 B1
(45) Date of Patent: May 8, 2001

(54) PROCESS FOR SEPARATING AND CHARACTERIZING SPOKEN ANNOUNCEMENTS IN A RADIO TRANSMISSION

(75) Inventors: Andreas Kynast; Andreas Vahle, both of Hildesheim; Oliver Ahrens; Ulrich Kersken, both of Diekholzen; Karin Hempel, Hildesheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/202,864
(22) PCT Filed: Feb. 20, 1997
(86) PCT No.: PCT/DE97/00309
  § 371 Date: Mar. 18, 1999
  § 102(e) Date: Mar. 18, 1999
(87) PCT Pub. No.: WO97/50265
  PCT Pub. Date: Dec. 31, 1997

(30) Foreign Application Priority Data
Jun. 25, 1996 (DE) .............................................. 196 25 429

(51) Int. Cl.[7] ............................. H04Q 7/22; G01L 11/02; H04M 11/06
(52) U.S. Cl. ........................ 704/270; 704/215; 455/414; 379/88.13
(58) Field of Search ................................... 704/215, 270; 455/414; 379/88.13

(56) References Cited

U.S. PATENT DOCUMENTS

| | | | |
|---|---|---|---|
| 5,146,612 | 9/1992 | Grosjean et al. | 455/45 |
| 5,396,497 | * 3/1995 | Veltman | 375/240.25 |
| 5,408,686 | * 4/1995 | Mankovitz | 455/66 |
| 5,526,284 | * 6/1996 | Mankovitz | 455/66 |
| 5,561,849 | * 10/1996 | Mankovitz | 455/45 |
| 5,581,576 | * 12/1996 | Lanzetta et al. | 375/216 |
| 5,774,798 | * 6/1998 | Gaskill | 455/186.1 |
| 5,898,732 | * 3/1995 | Dapper et al. | 375/268 |

FOREIGN PATENT DOCUMENTS 0 686 909  12/1995  (EP) .................................. 379/93.08

OTHER PUBLICATIONS

A. C. Gidlow, "Data Services On PCN", Colloquium on Roaming with Data, Mar. 6, 1995, pp. 1/03–8/03.

* cited by examiner

Primary Examiner—Tālivaldis I. Šmits
(74) Attorney, Agent, or Firm—Kenyon & Kenyon

(57) ABSTRACT

A method of separating and identifying verbal announcements in a wireless transmission according to the GSM standard, in which verbal announcements from the audio stream can be associated with digital signals with the help of an ID number, so that the announcements can be separated.

14 Claims, 2 Drawing Sheets

PROCESS FOR SEPARATING AND CHARACTERIZING SPOKEN ANNOUNCEMENTS IN A RADIO TRANSMISSION

BACKGROUND INFORMATION

Methods of transmitting and selectively reproducing announcements via the radio data system (RDS) are known. For transmitting messages via the mobile wireless network, the GSM (Global System for Mobile Communication) has been established under the European Digital Cellular Telecommunication System's ETSI standard. The digital signals in the Short Message System (SMS) channel are defined in the pr ETS 300536 draft of August 1995 and the pr ETS 300537 draft of March 1995. The SMS is transmitted simultaneously but asynchronously with the audio stream.

SUMMARY OF THE INVENTION

The method according to the present invention of separating and identifying verbal announcements has the advantage that announcement blocks containing individual announcements are transmitted, with which an identification number is associated and thus unambiguous association of the announcement with the information in the respective digital signal, which conveys the data for selection of the announcement in the receiver, is made possible.

In transmitting announcements and digital signals over the mobile wireless network, the GSM (Global System for Mobile Communication) standard is preferably used. This standard allows verbal traffic announcements to be transmitted via a voice channel, while the digital signals are transmitted simultaneously in a GSM control/signal channel.

The digital signals are advantageously transmitted in the Short Message Service (SMS) channel.

The ID number can advantageously be a sequence of numbers in increasing order of transmission, so that, for example, block 2 corresponds to digital signal 2, regardless of the time of receipt.

In order to separate an announcement in the receiver, the receiver must recognize the beginning and the end of the announcement, which can be achieved using a detector system.

In doing so, the length of the pause between two verbal announcements is advantageously measured, the length of this pause depending on the duration of the verbal announcement. In order to keep the pause to a minimum, the length of the announcement is multiplied by a factor F, which is known to the transmitter and the receiver.

Thus an announcement can be classified as correct and stored if a pause with the calculated duration follows the end of the announcement.

The beginning and end of the transmission, as well as a transmission error, are advantageously recognized and signaled by a fixed stored signal being sent by the receiver to the transmitter.

It is also advantageous if the transmitter marks the beginning and the end of a verbal announcement by tone signals sent to the receiver.

Communication between transmitter and receiver takes place via a tone marker, for example.

Tone sequences, for example, dual tone multifrequency signals, are sent back to the transmitter as a response and acknowledgment of a correct transmission. The tone signals communicate the ID number of the latest correct announcement. This has the advantage that only correct announcements are thus stored in the receiver; otherwise a new sequence of announcements is sent to the receiver.

Separation of announcements in a fixed time reference represents an advantageous method, where each announcement block is preceded by a digital signal with information concerning the duration of the individual announcements. After communication has been successfully established, the receiver waits for the beginning of the announcement block at the following point in time, which is predefined in the common time reference of the transmitter and the receiver.

DETAILED DESCRIPTION

Traditionally traffic announcements have been generally broadcast via radio transmitters. In suitable receivers located in the motor vehicle, a selection of the announcements that can be associated with the streets being traveled is performed, for example, via TMC. On the other hand, if mobile telephone is used, the traffic message is requested individually by the receiver and is therefore also available independently of the radio transmission times. For this purpose, the car driver requests announcements concerning his or her path of travel. The transmitter transmits an announcement block, and the receiver selects the relevant information in the individual announcements with the help of digital signals. When using the GSM standard for transmitting verbal announcements and digital signals in wireless systems, the structure and encoding of the digital signals are established in the pr ETS 300 536 draft of August 1995 and the pr ETS 300 537 draft of March 1995. The verbal announcements are transmitted in the GMS voice channel and must be synchronized with the digital signals transmitted in a GSM control/signal channel so that a selective voice and/or text output of the individual announcements is made possible in the receiver (MS: mobile station). When voice information is requested through the GSM voice channel, this information is transmitted at the same time, but asynchronously, via a data channel using the Short Message Service (SMS). However, since it cannot be guaranteed that both information streams will be transmitted synchronously (the Short Message (SM) also passes through a Short Message Service Center (SMSC)), the data channel cannot be used for synchronization. Synchronization is required, so that individual announcements can be separated from the audio stream, and the data of an announcement (from the SMS) can be associated with the announcement itself.

Figure 1:
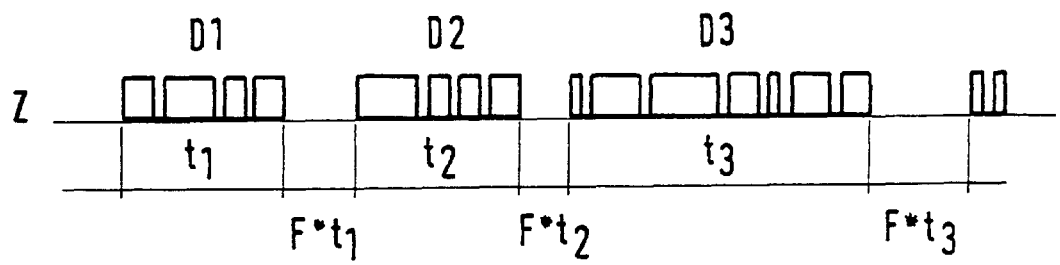
FIG. 1 shows a variation of announcements and corresponding pauses over time.

FIG. 1 shows the voice channel of the control center, with different announcement D1 through D3. Announcements contain small pauses intended to represent the voice pauses in the spoken text. Control station Z calculates, from duration $t_1$ of the first announcement, a pause time with factor F. As it transmits the announcement, the control station attaches the calculated pause length $F*t_1$ to the announcement. Factor F ensures minimum pause times and it is known to the control station and the receiver.

Figure 2:
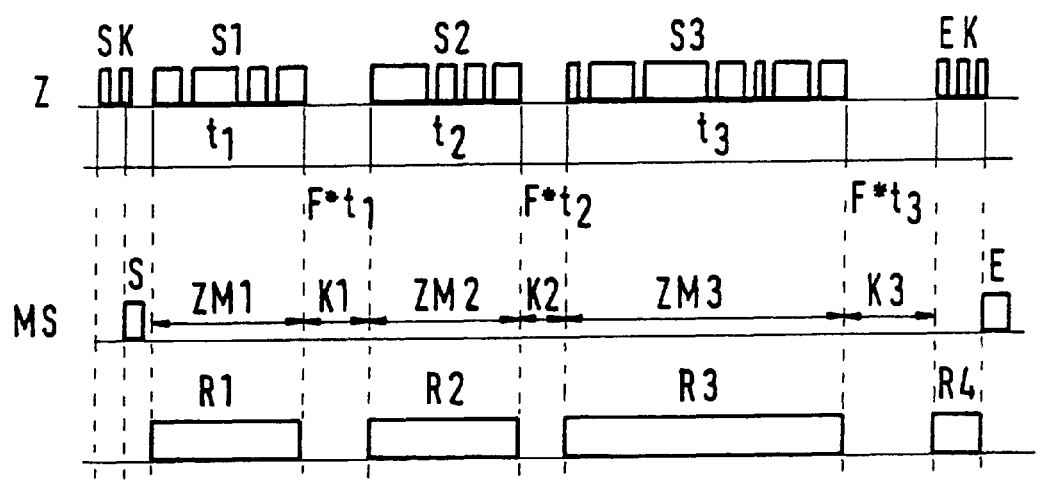
FIG. 2 shows a variation over time during communication with a receiver.

FIG. 2 shows the announcement transmission process. First, the control station transmits a start code SK. The receiver responds, after recognizing the start code, with a start signal S, which it transmits to the control station. The receiver is capable of recognizing the beginning and the end of the announcement from the audio stream with the help of an internal detector. A threshold value detector, for example, a voice detector, can be used for detecting the beginning of the announcement. The detector in receiver MS recognizes the beginning of the first announcement and starts recording R1. After receiving and recognizing an announcement and the subsequent pause in receiving station MS, the receiver measures duration ZM1 of the announcement and duration K1 of the pause. The receiver checks whether the condition K1=F*ZM1 is met. If this condition is met, this announcement is recognized as valid and correctly transmitted and is therefore separated. The same procedure is followed with all the other announcements. Each separate announcement is given an ID number according to the time sequence. At the same time, an SMS with the data of all the announcements of an announcement block is transmitted via the digital channel. Since the sequence of the announcements within an audio stream is identical with the sequence of the information in the SMS, the announcements can be associated with data according to the ID number. If receiver MS receives an end code EK instead of an announcement, it responds with an end signal E. The record received, in FIG. 2 record R4, is discarded, and the transmission is terminated. The start and end codes (SK, EK) must be signals that the detector in the receiver can distinguish from the announcements by their frequency, level, and/or duration. The start, end, and error signals (S, E, N) of the receiver are generated in the receiver itself, for example, and may be advantageously stored in the voice memory as tone sequences. Alternatively, transmission of tone signals by the transmitter as the connection is established is also conceivable.

If an error occurs during the transmission of an announcement, for example, the pause time is incorrect, the receiver sends an error signal N to the transmitter and thus requests that this announcement be repeated.

Figure 3:
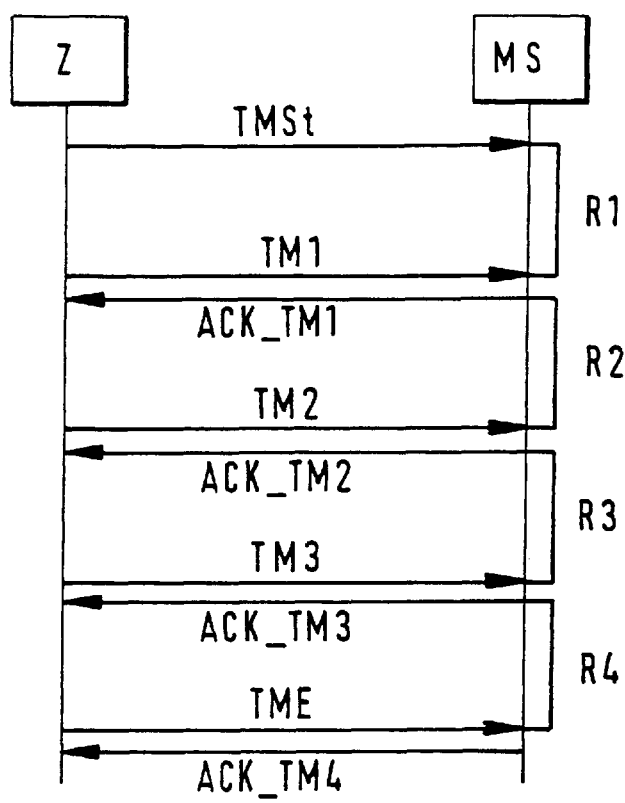
FIG. 3 shows an establishment of communication with tone signals.

In another advantageous embodiment of the present invention, a handshake method, which marks the beginning and the end of a verbal announcement with the help of tone sequences, is selected for separating verbal announcements. For this purpose, additional communication signals are exchanged between the control station and the receiver. In the downlink (communication from control station to receiver MS), a tone marker is used as a communication signal. In the uplink (communication from receiver MS to the control station), the Dual Tone Multi-Frequency (DTMF) method is used for signaling. The use of DTMF in the uplink is provided in the specification of digital wireless networks according to the GSM. FIG. 3 shows the time sequence of the communication of control station Z with receiver MS. After establishing the connection, the control station transmits a tone marker TMSt as a start code. The receiver recognizes the beginning of the first announcement of the announcement block and started record R1. At the end of an announcement, the control station transmits tone marker TM1. The receiver stops the recording and responds to the signal with a DTMF acknowledgment (ACK_$TM_i$). Simultaneously with the transmission of the acknowledgment signal, the voice recording is restarted. Upon the last voice segment, the control station transmits the tone marker TME, to which the receiver responds with an acknowledgment ACK_$TM_i$ (where i is the number of the latest announcement transmitted). Then the connection is terminated. Each acknowledgment signal, transmitted via DTMF, corresponds to the respective ID number of the stored announcement R. Each separate announcement R1 through $R_n$ is given an ID number in increasing order over time. Since the sequence of announcements within an audio stream is identical to the sequence of data within the digital signals SMS, the announcements can be associated with data using the ID number.

Another advantageous embodiment allows the announcements to be separated from the audio stream on the basis of time information communicated to the receiver via the digital signals prior to the beginning of the announcement block. In addition, transmitter and receiver are subject to a time reference, which sets a point in time every 10 sec., for example. The absolute time for transmitter and receiver is picked up from a wireless time signal.

Figure 4:
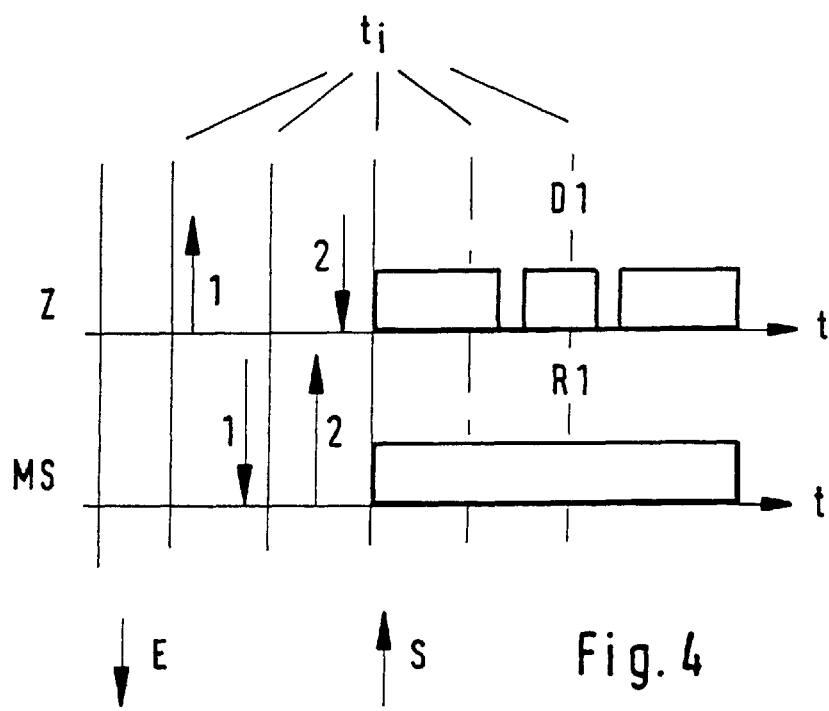
FIG. 4 shows a communication sequence with a fixed time reference.

FIG. 4 shows the time sequence of the communication between control station Z and receiver MS. As shown in FIG. 4, the control station establishes a connection with receiver MS and transmits (S) a digital SMS signal unit 1 to the receiver; then it terminates the connection. If the digital SMS signal 1 is correctly received by the receiver (E), it establishes a connection with the control station and transmits a DTMF signal 2. If the control station receives DTMF signal 2, it starts with the transmission of the announcement D1, etc. at the first possible point in time in the time reference $t_i$. At the same time, the receiver begins to record the announcement signal. The pause times between the individual announcements D1, D2, etc. are constant and known to both transmitter and receiver. The individual announcement blocks R are separated and recorded as received due to the data transmitted concerning the duration of each announcement in the announcement block and the known pause time. The time reference contains points in time, for example, every 10 seconds. Information concerning the individual announcements and their lengths is transmitted with an SMS prior to the transmission of the next announcement block. The announcements are associated with the digital signals using the ID number of the transmission sequence.

The method according to the present invention can be used for transmitting traffic announcements. Other announcements, for example search announcements and disaster warnings, can, however, be selectively received and forwarded using the method according to the present invention.

What is claimed is:

1. A method for separating and identifying verbal announcements from an audio stream in a receiver, the method comprising the steps of:

(a) wirelessly transmitting digital signals simultaneously with the audio stream;

(b) after step (a), transmitting the verbal announcements in an announcement block to the receiver;

(c) after step (a), assigning an ID number to the verbal announcements in the receiver, the ID number associating data provided in digital signals with the announcement block; and (d) after step (a), selecting the verbal announcements as a function of the data in the digital signals.

2. The method according to claim 1, wherein the verbal announcements and the digital signals are transmitted according to a Global System for Mobile Communications ("GSM") standard.

3. The method according to claim 1, wherein step (a) includes the substep of:

transmitting the digital signals in a Short Message Service channel and in a voice channel.

4. The method according to claim 1, wherein the ID number is assigned in an increasing order with a transmission sequence.

5. The method according to claim 1, further comprising the step of:
(e) detecting a start and an end of a particular announcement of the verbal announcements in the receiver using a detector system.

6. The method according to claim 1, wherein a length of pauses between the verbal announcements is associated with a length of the verbal announcements using a predetermined fixed factor.

7. The method according to claim 1, further comprising the steps of:
(f) separating a particular announcement of the verbal announcements from the audio stream; and
(g) storing the particular announcement in the receiver if a transmission pause following the particular announcement has a predetermined duration.

8. The method according to claim 1, further comprising the steps of:
(h) storing a start signal, an end signal and an error signal in a memory device of the receiver as tone signals; and
(i) when one of the start signal, the end signal and the error signal is detected in the receiver, sending a predetermined tone signal to a transmitter.

9. The method according to claim 1, further comprising the steps of:
(j) transmitting tone signals from a transmitter to the receiver; and
(k) marking a start and an end of the verbal announcements with the tone signals.

10. The method according to claim 9, wherein the start and the end of the verbal announcements are marked with a tone marker when the transmitter and the receiver are communicating.

11. The method according to claim 1, further comprising the step of:
(l) transmitting the ID number of a successfully received announcement of the verbal announcements back to a transmitter as a tone signal when the receiver and the transmitter are communicating.

12. The method according to claim 1, further comprising the step of:
(m) transmitting the ID number of a latest correctly transmitted announcement of the verbal announcements back to a transmitter as a dual tone multi-frequency signal when the receiver and the transmitter are communicating.

13. The method according to claim 1, further comprising the step of:
(n) before starting a particular announcement of the verbal announcements, transmitting a particular signal of the digital signals which includes information corresponding to a duration of a next announcement of the verbal announcements.

14. The method according to claim 1, further comprising the step of:
(o) transmitting, with a transmitter, a particular announcement of the verbal announcements which has a predetermined duration at a particular time of a predetermined fixed time reference of at least one of the transmitter and the receiver.

\* \* \* \* \*